(12) United States Patent
Nurmi

(10) Patent No.: US 9,990,062 B2
(45) Date of Patent: Jun. 5, 2018

(54) APPARATUS AND METHOD FOR PROXIMITY BASED INPUT

(75) Inventor: Mikko Nurmi, Tampere (FI)

(73) Assignee: Nokia Technologies Oy, Espoo (FI)

( * ) Notice: Subject to any disclaimer, the term of this patent is extended or adjusted under 35 U.S.C. 154(b) by 663 days.

(21) Appl. No.: 12/732,816

(22) Filed: Mar. 26, 2010

(65) Prior Publication Data

US 2011/0234491 A1 Sep. 29, 2011

(51) Int. Cl.
*G06F 3/041* (2006.01)
*G06F 3/0488* (2013.01)

(52) U.S. Cl.
CPC .......... *G06F 3/041* (2013.01); *G06F 3/0488* (2013.01); *G06F 2203/04808* (2013.01)

(58) Field of Classification Search
CPC .......... G06F 3/041; G06F 3/0488; G06F 2203/04808
USPC .............. 345/173–178; 178/18.06
See application file for complete search history.

(56) References Cited

U.S. PATENT DOCUMENTS

| | | |
|---|---|---|
| 6,243,054 B1 | 6/2001 | DeLuca |
| 6,559,813 B1 | 5/2003 | DeLuca et al. |
| 2006/0161871 A1 | 7/2006 | Hotelling et al. |
| 2007/0257891 A1* | 11/2007 | Esenther ............ G06F 3/044 345/173 |
| 2008/0158172 A1* | 7/2008 | Hotelling ........... G06F 1/3231 345/173 |
| 2008/0165141 A1* | 7/2008 | Christie ............. G06F 3/044 345/173 |
| 2008/0168403 A1 | 7/2008 | Westerman et al. |
| 2009/0051660 A1* | 2/2009 | Feland, III .......... G06F 3/04883 345/173 |
| 2009/0228828 A1* | 9/2009 | Beatty ............... G06F 3/0488 715/786 |
| 2009/0284478 A1* | 11/2009 | De la Torre Baltierra ........... G06F 3/04883 345/173 |
| 2010/0107067 A1* | 4/2010 | Vaisanen ............ G06F 3/0486 715/702 |
| 2010/0214218 A1 | 8/2010 | Vaisanen et al. |

FOREIGN PATENT DOCUMENTS

| | | |
|---|---|---|
| EP | 1 517 228 A2 | 3/2005 |
| WO | WO 2010/095109 A1 | 8/2010 |

OTHER PUBLICATIONS

International Search Report and Written Opinion for Application No. PCT/FI2011/050174 dated Jun. 9, 2011.

* cited by examiner

*Primary Examiner* — Ryan A Lubit
(74) *Attorney, Agent, or Firm* — Alston & Bird LLP

(57) ABSTRACT

A method is provided for controlling proximity detection based user interface functions. In response to detection of simultaneous presence of a first object and a second object in close proximity to the input surface, an input mode may be activated, in which input mode a first action is associated with an input by the first object and a second action is associated with an input by the second object.

18 Claims, 5 Drawing Sheets

APPARATUS AND METHOD FOR PROXIMITY BASED INPUT

TECHNOLOGICAL FIELD

Embodiments of the present invention relate to an apparatus and a method for detecting proximity based input.

BACKGROUND

Touch screens are used in many portable electronic devices, for instance in PDA (Personal Digital Assistant) devices, tabletops, and mobile devices. Touch screens are operable by a pointing device (or stylus) and/or by finger. Typically the devices also comprise conventional buttons for certain operations.

Three dimensional (3D) content display techniques and 3D interaction, or sense of 3D interaction, have been under development also for portable electronic devices. It has been suggested to apply also the space above a touch screen surface as further means for user inputs.

SUMMARY

Various aspects of examples of the invention are set out in the claims.

According to an aspect, an apparatus is provided, comprising at least one processor; and at least one memory including computer program code, the at least one memory and the computer program code configured to, with the at least one processor, cause the apparatus at least to perform: detect presence of a first object in close proximity to an input surface, detect presence of a second object in close proximity to the input surface, and in response to the detection of simultaneous presence of the first object and the second object, activate an input mode in which a first action is associated with an input by the first object and a second action is associated with an input by the second object.

According to an aspect, a method is provided, comprising: detecting presence of a first object in close proximity to an input surface, detecting presence of a second object in close proximity to the input surface, and in response to the detection of simultaneous presence of the first object and the second object, activating an input mode in which a first action is associated with an input by the first object and a second action is associated with an input by the second object.

According to an aspect, there is provided a user interface for an electronic device comprising a proximity detection system with at least one proximity detector for detecting presence of a first object and a second object in close proximity to an input surface, wherein the user interface is configured to operate in an input mode, in which a first action is associated with an input by the first object and a second action is associated with an input by the second object, in response to the detection of simultaneous presence of the first object and the second object.

According to an embodiment, the input mode is deactivated in response to detecting removal of the first object and/or the second object from close proximity to the input surface.

The various embodiments of the invention provide several advantages, which will become apparent from the detailed description below.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION

Figure 1:
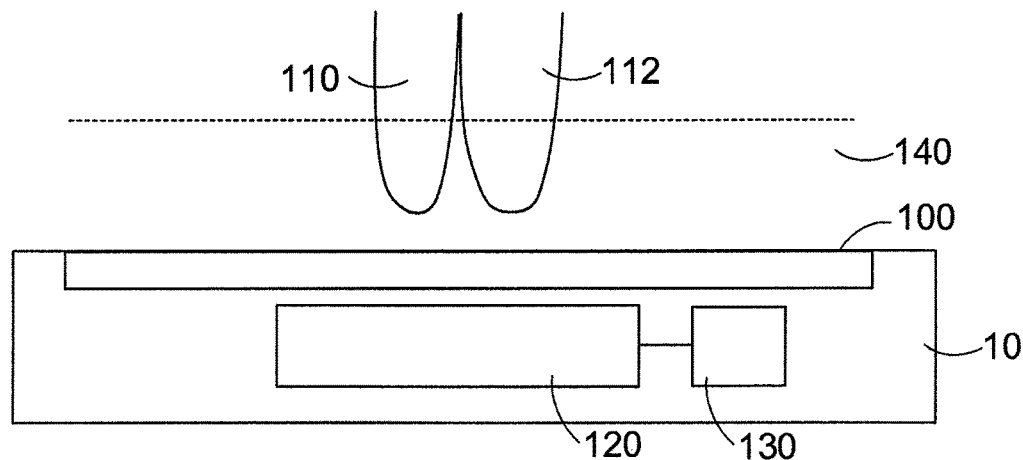
FIG. 1 is a simplified block diagram of a side view of an input apparatus in accordance with an embodiment of the invention.

FIG. 1 illustrates an apparatus 10 with one or more input and/or output devices. The input devices may for example be selected from buttons, switches, sliders, keys or keypads, navigation pads, touch pads, touch screens, and the like. The output devices may be selected from displays, speakers, indicators, for example.

The apparatus 10 further comprises a proximity detection system or unit 120 configured to detect when an object 110, 112, such as a finger or a stylus, is brought in close proximity to, but not in contact with, an input surface 100. The input surface 100 may be a surface of a touch screen or other input device of the apparatus capable of detecting user inputs. For instance, the input surface 100 could be provided at housing in connection with an input device, such as a button, or as a specific input area on side(s) or back (in view of the position of a display) of a handheld electronic device.

A sensing area 140 may illustrate the approximate area and/or distance at which an object 110, 112 is detected to be in close proximity to the surface 100. The sensing area 140 may also be referred to as a hovering area and introduction of an object 110, 112 to the hovering area and possible further (non-touch) inputs by the object 110, 112 in the hovering area may be referred to as hovering. In some embodiments the hovering area 140 enables also inputting and/or accessing data in the apparatus 10, even without touching the input surface 100.

The apparatus 10 further comprises or is coupled to a controller 130. The proximity detection system 120 is configured to provide the controller 130 with signals when an object 110, 112 enters the hovering area 140. Based on such input signals, commands, selections and other types of actions may be initiated, typically causing visible, audible and/or tactile feedback for a user.

The apparatus 10 may be a peripheral device, such as a keyboard or mouse, or integrated in an electronic device. Examples of electronic devices include any consumer electronics device like computers, media players, wireless communications terminal devices, and so forth.

Figure 2:
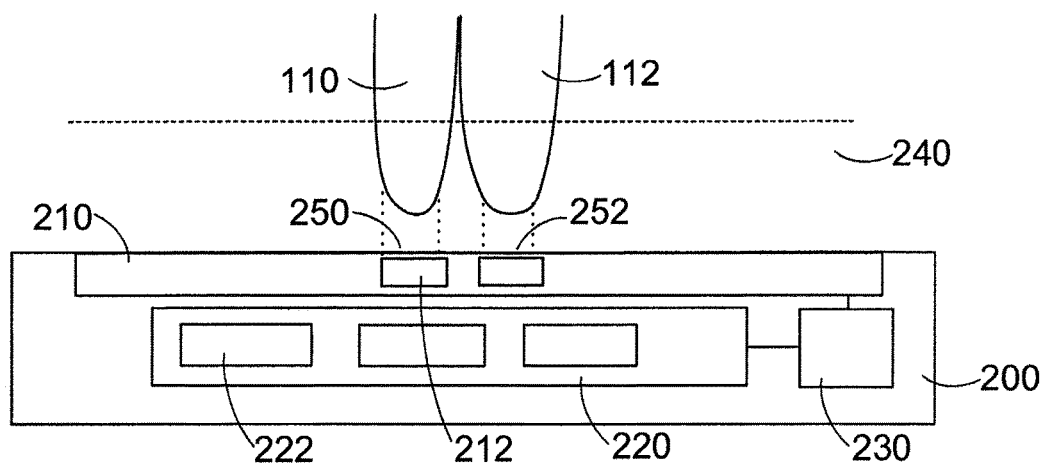
FIG. 2 is a simplified block diagram of a side view of an apparatus in accordance with an embodiment of the invention.

In some embodiments, a proximity detection system 120 is provided in an apparatus comprising a touch screen display. FIG. 2 illustrates an apparatus 200 according to an embodiment comprising a touch screen 210. A plurality of touch sensitive detectors 212 is provided to detect inputs to screen display surface portions.

The apparatus 200 comprises a proximity detection circuit 220 for detecting objects 110, 112 in close proximity to the surface of the touch screen 210. In some embodiments the detection system 220 generates a sensing field by one or more proximity sensors 222.

In one embodiment a capacitive proximity detection system is applied, whereby the sensors 222 are capacitive sensing nodes. Disturbances by one or more objects 110, 112 in the sensing field are monitored and presence of one or more objects is detected based on detected disturbances. A capacitive detection circuit 220 detects changes in capacitance above the surface of the touch screen 210.

However, it will be appreciated that the present features are not limited to application of any particular type of proximity detection. The proximity detection system 120, 220 may be based on infrared proximity detection, optical shadow detection, acoustic emission detection, ultrasonic detection, or any other suitable proximity detection technique. For instance, in case the proximity detection system 120, 220 would be based on infrared detection, the system would comprise one or more emitters sending out pulses of infrared light. One or more detectors would be provided for detecting reflections of that light from nearby objects 110, 112. If the system detects reflected light, then an object is assumed to be present. The detection system 120, 220 may be arranged to estimate the distance of an object from the input surface. Depending on the technique applied, the size of the apparatus and the input surface, and the desired user interaction, the hovering area 140, 240 may be arranged to extend from the input surface by distance selected from some millimeters to even up to multiple dozens of centimeters, for instance. The proximity detection system 120, 220 may detect also further parts of user's hand, but the system may be arranged to recognize such false inputs and avoid further actions.

The detection circuit 220 is coupled to a controller 230. Inputs to the touch screen detectors 212 may be signalled via a control circuitry to the controller 230, or another controller. The controller 230 may also be connected to one or more output devices, such as the touch screen display 210. The controller 230 may be configured to control different application views on the display 210.

The proximity detection system 120, 220 is configured to detect and indicate simultaneous proximity of multiple objects 110, 112. Each of the objects 110, 112 detected simultaneously in the hovering area 140, 240 may be associated with at least one action or functionality, which is initiated in response to a further input by the respective object.

Further inputs may be provided by the objects 110, 112 in the hovering area 240, within respective input areas 250, 252. The apparatus 200 may be configured to detect such further inputs in response to detecting one or more of the objects 110, 112 pressing the touch screen display surface and/or performing a specific gesture in the hovering area 240. A broad range of functions is available for selection to be associated with an input detected by a touch sensitive detection system and/or the proximity detection system 220. The controller 230 may be configured to adapt the associations according to a current operating state of the apparatus 200, a user input or an application executed in the apparatus 200, for instance. For instance, associations may be application specific, menu specific, view specific and/or context (which may be defined on the basis of information obtained from the current environment or usage of the apparatus 200) specific. It is to be noted that one or more input areas 250, 252 and/or objects 110, 112 may be set to represent a particular action regardless of the current operating state of the electronic device. One or more associations may be adapted specifically in response to detecting that two or more objects 110, 112 are introduced in the hovering area 140, 240.

Figure 3:
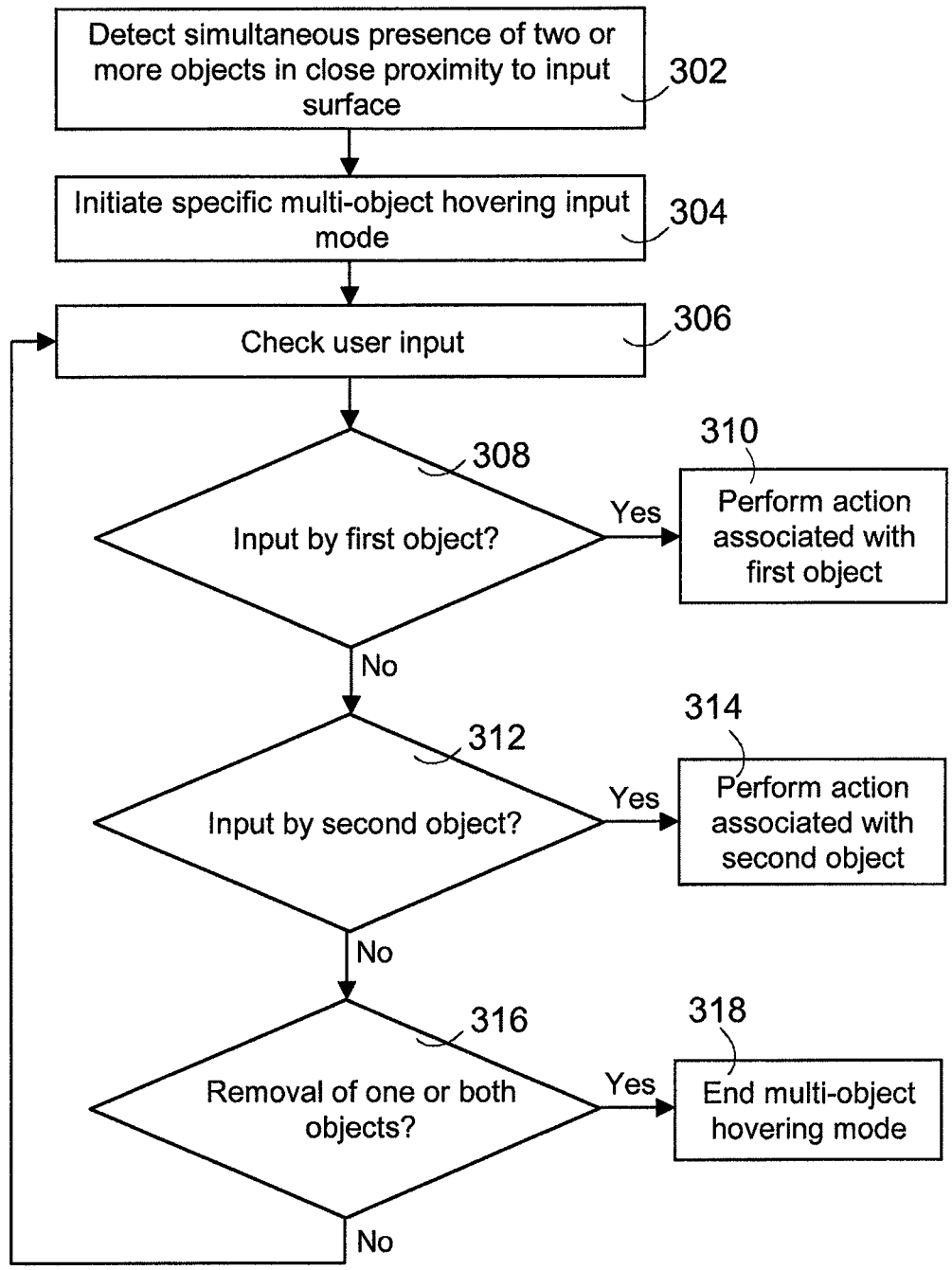
FIG. 3 illustrates a method according to an embodiment of the invention.

FIG. 3 shows a method for controlling a multi-object hovering input mode according to an embodiment. The method may be applied as a control algorithm by the controller 130, 230, for instance. The method starts in step 302, whereby simultaneous presence of two or more objects in close proximity to an input surface 210 is detected. Thus, step 302 may be entered when the two or more objects 110, 112 have been detected in the hovering area 140, 240, even though physical contact is not made with the input surface. There may be further conditions, such as that the objects are within a predefined distance from each other, or that one or more of the objects are within a predefined distance from an object or surface of an input surface of an electronic device.

In response to the detection of step 302, user interface functionality is adapted by initiating 304 a specific input mode, herein referred to as a multi-object hovering input mode. Thus, one or more specific actions may be associated or linked with the first object and/or the second object, which actions are not available during separate use of the first or second object.

The method illustrated in FIG. 3 continuously checks 306 for hovering and/or touch-based user inputs. In response to initiating the multi-object hovering mode, the method may start to determine the source of an input. If an input by the first object is detected 308, an action associated with the first object may be performed 310. If in step 312 an input by the second object is detected, an action associated with the second object may be performed 314.

Although not illustrated in FIG. 3, the method typically also checks the target (information element) of the input, for instance an application area or window or a particular graphical user interface (GUI) element on the display. Thus, a software function currently associated with a hovering input area 250, 252 may be determined.

The method further checks 316 if removal of one or both objects from close proximity to the surface 100 has been detected. If yes, in step 318 the multi-object hovering mode is deactivated or ended. Otherwise, the method may return to step 306 to check for subsequent user inputs. Although not illustrated in FIG. 3, the procedure may return from operations 310 and 314 to operation 306 to check for further user inputs or to operation 316.

The source of the input, e.g., whether an input is provided by the first or second object (or a further object) may be determined 306, 308, 312 in various ways. In one embodiment the proximity detection system 120, 220 and/or controller 130, 230 is arranged to determine the source of the input on the basis of analyzing the position of the detected input in relation to the other object's sensed position. On the basis of the detected relational position, the object providing the input may be determined 308, 312 and associated action selected 310, 314. The procedure may determine the position of the inputting object in relation to the x-axis and/or y-axis (along the input surface). For instance, if the input by an object 112 is detected on left side of the other (hovering) object 110 is detected. The position of the objects in relation to each other may be determined in response to detecting an input or monitored continuously. In another embodiment, the procedure may be arranged to determine the source of the input on the basis of one or more sensed properties of the objects 110, 112. Instead of in addition to utilizing sensed information on (ends) of the objects in the hovering area, further detected information e.g. on user's hand may be utilized when determining the inputting object. For instance, the apparatus 10, 200 may be arranged to detect the user's hand and if left or right hand is used for hovering.

Figure 4:
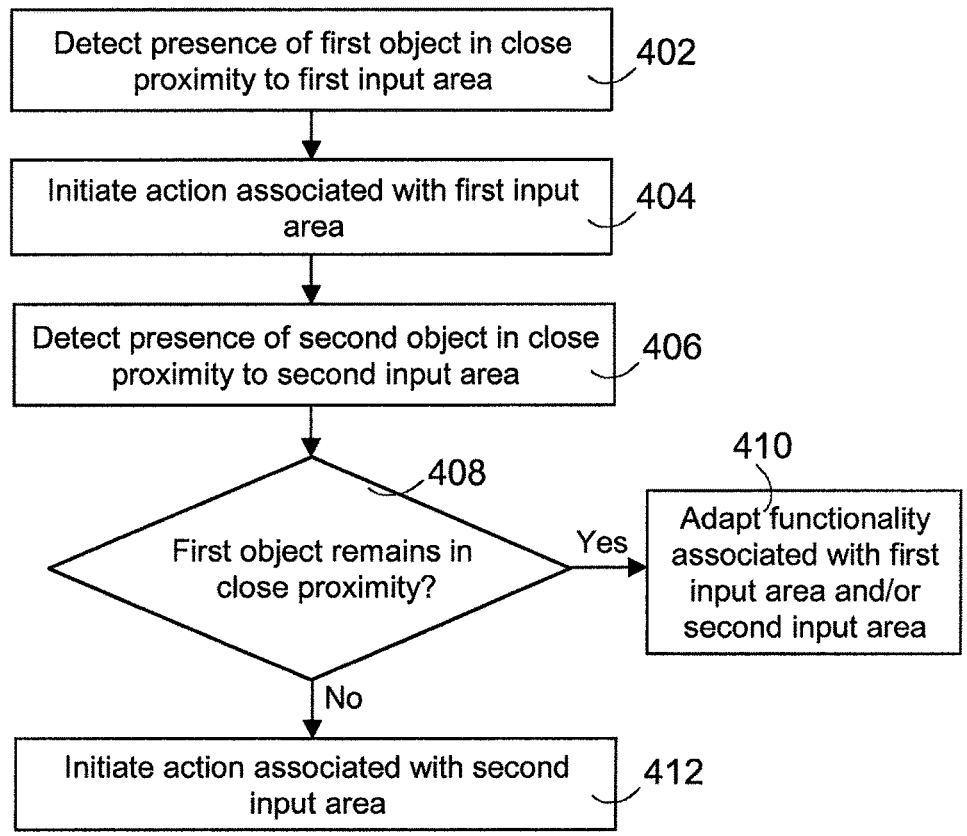
FIG. 4 illustrates a method according to an embodiment of the invention.

FIG. 4 illustrates a method according to another embodiment. The method may be applied as a control algorithm in the controller 130, 230 checking detected inputs and controlling further user interface functions based on detected inputs.

In step 402 presence of an object is detected in close proximity to a first input area. For instance, the object 110 of FIG. 2 is detected to be in close proximity to the first input area 250. An action associated with the first input area is initiated 404. For instance, a graphical user interface (GUI) element may be displayed nearby the first input area, but a wide variety of other action options also exist.

The method continues to monitor any hovering inputs. The simplified FIG. 4 illustrates the detection of presence of a second object in close proximity to a second input area in step 406. For instance, the object 112 may be detected in the hovering area above the second input area 252 of the touch screen display 210.

The method may in step 408 check if the first object still remains in close proximity to the input surface 100, in the example of FIG. 2 in the hovering area 240 or the specific input area 250. If so, in step 410 user interface functionality associated with the first input area and/or the second input area is adapted. Thus, the multi-object hovering mode illustrated in connection with FIG. 3 and step 304 may be initiated.

If the first object has been removed from the hovering area 240, the multi-object hovering mode may be deactivated, as illustrated in connection with step 318, and an action associated with the second input area in a single-input hovering mode may be initiated 412.

The present features enable to bring further versatility and input options for user interfaces with hovering capability. In case of application of two objects, a third input level or configuration is thus provided by the simultaneous presence of the two objects at the hovering area. Predetermined object-specific actions during the multi-object input mode may be provided, even regardless of the position of the input in relation to the input area.

Figure 5A:
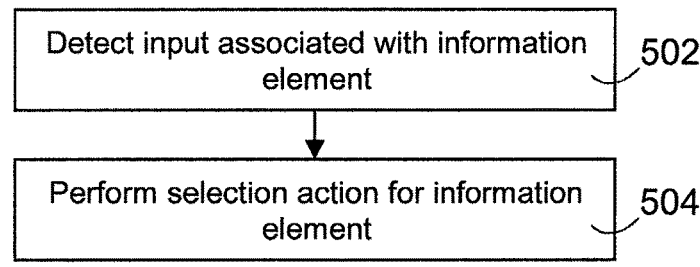
FIGS. 5*a* and 5*b* show an example of a method according to an embodiment of the invention.

In some embodiments the multi-object hovering mode provides at least some functions similar to the functions of a computer mouse. FIG. 5a illustrates an embodiment in which functionality of left mouse button is associated with the first (or second) object during the presence of at least two objects in close proximity to the input surface 100.

In step 502 an input associated with information element is detected. For instance, an input by the first object 110 to the input area 240 displaying a GUI element is detected. A selection action is performed 504 for the information element. The information element may be displayed as selected, or a further action may be performed for the selected information element. For instance, in case of double-click type of double input by the first object to an item in a list of items causes first selection of the item and then opening of a window for the selected item.

Figure 5B:
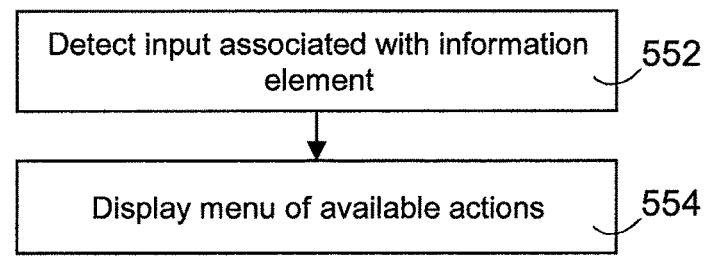

FIG. 5b illustrates basic features for a typical right mouse button input. In step 552 an input associated with an information element is detected. For instance, a hovering input or an input to the touch screen 210 surface by the second object 112 to a GUI element displayed on the second area 242 is detected. In step 554 a menu of available actions is displayed. The menu may be context-sensitive and dependent on current state of the user interface or an application, application window or information element being selected, for instance. The menu may include textual information, images and/or any other graphical information.

Thus, dedicated mouse button functionality may be enabled by introducing the at least two objects in the hovering area 140, 240. The right or left mouse action may be selected by the further input with the associated object.

Figure 6A:
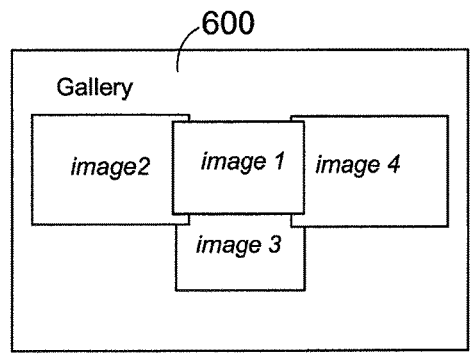
FIGS. 6*a* to 6*d* illustrate a sequence of user interface actions according to an embodiment of the invention.
Figure 6B:
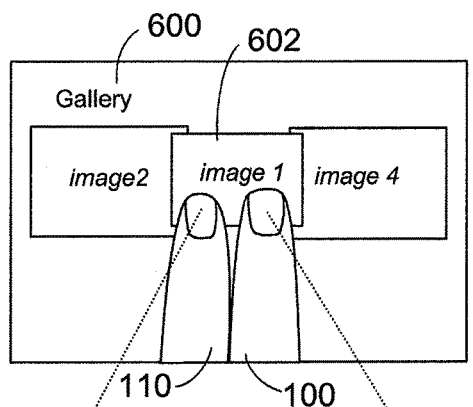

FIGS. 6a to 6d illustrate a user interface interaction sequence according to an embodiment. FIG. 6a illustrates the initial display contents with a plurality of image GUI elements. When a user moves two of his fingers on top of the screen and in close proximity to the screen surface, for instance the index and middle finger 110, 100 as illustrated in FIG. 6b, a proximity detection system detects that now there are two fingers on top of the screen area. A control system, for instance the controller 130, 230 initiates the multi-object hovering mode by linking functionality of left mouse button to the left finger and right mouse button functionality to the right finger. If the user presses the screen with one of the fingers, then the press activates either the right or left mouse button functionality depending on which finger was used.

Figure 6C:
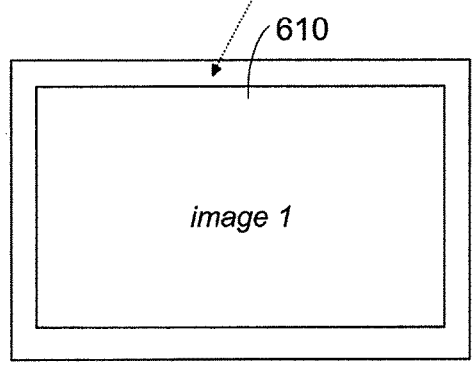

As illustrated in FIG. 6c, if the user presses the image1 602 with his left finger such detected input is associated with functionality, similar to the functionality associated with pressing a left mouse button, and an image associated with the input area may be opened 610 to full screen mode.

Figure 6D:
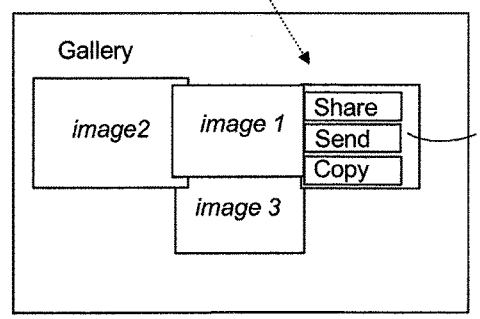

As illustrated in FIG. 6d, if the user presses the image1 602 with his right finger 100, such detected input is associated with functionality similar to right mouse button functionality and a pop-up menu 620 may be activated.

The above-illustrated functionality enables to provide a virtual hovering mouse, which can be used across the UI as a replacement for traditional mouse functionality. Conventional mouse click functionality and logic may be provided by the hovering mouse. In addition or instead of the above-illustrated functions, further mouse button functionality, including non-click interaction such as scrolling, and various combinations of two or more mouse buttons may be applied to offer further and new UI interactions.

In one embodiment the proximity detection system may be arranged to detect combined use of two or more objects, which may be interpreted as a third type of input in the multi-object hovering input mode. An operation may be associated with the combination of inputs by two or more objects 110, 112. For instance, a multi-touch input simultaneously with two objects may be associated with another action than that of a touch input by only a single object. Thus, there may be one or more further checks for inputs in addition to the checks 410, 412, such as a third check for simultaneous input by the first and the second object.

The actions illustrated in connection with FIGS. 5a to 6d typically associated with mouse buttons represent only some examples of available actions which may be associated with the objects 110, 112 during the multi-object hovering mode. For instance, such actions may be selected from the group of panning, rotating, scrolling, editing, zooming, reshaping of objects, etc.

FIGS. 3 to 6d above illustrate only some of the available methods and functionality to arrange a multi-object functionality in response to detecting two or more objects in close proximity to an input surface. Some further or alternative embodiments are illustrated below.

According to some embodiments, more than two objects 110, 112 are simultaneously used in the hovering area 140, 240, and specific functions may be triggered in response to detecting further objects. For instance, introduction of a combination of three or four fingers in the hovering area 140, 240 may trigger a further specific functionality or mode. One further example is that three object virtual mouse functionality is initiated in response to detecting three fingers in the hovering area. The middle object may be associated with roll functionality, for instance.

According to some embodiments, at least one association to a graphical user interface element to be displayed is modified in response to activation 304, 410 of and/or an action during the multi-object hovering mode. This generally refers to adding and/or modifying one or more information elements on the display. For instance, a specific GUI is displayed temporarily or during the multi-object hovering mode. Further outputs, e.g. an audible and/or tactile output may also be produced by the apparatus 10, 200 in response to entering the multi-object hovering mode and/or in response to detection of an input during the multi-object hovering mode. Thus, the user may be informed that the specific multi-object hovering mode is supported and the input logic is changed. In a further embodiment an area of the touch screen is expanded during the multi-object hovering mode. An area may be expanded also in response to detecting an object over the area during the multi-object hovering mode.

Software functions or actions available during the multi-object hovering mode and associated with the hovering area 140, 240, and/or specific input area 250, 252 may be indicated to the user, for instance on the touch screen 210. The function may be indicated when the function is available in the respective area 140, 240, 250, 252 and/or when an input to the hovering area 250, 252 has been detected.

In one embodiment the object(s) detected in the hovering area 140, 240 and/or the actions available by the respective object(s) are indicated to the user during the multi-object hovering mode. For instance, each available action is indicated by a GUI element associated with a GUI visualizing the respective object 110, 112. Visualizations of the actions and/or objects may be displayed on a screen, and in case of autostereoscopic displays also various 3D visualization options exist.

In one embodiment the objects 110, 112 detected in the hovering area 140, 240 are displayed. For instance, an image of one, two or more fingers is displayed in accordance with the number of objects detected in the hovering area 140, 240. In another example, in connection to applying the visual mouse mode, an image of a mouse may be displayed. In a still further example the apparatus 10, 200 may be arranged to display non-transparent or semi-transparent shadows of the objects 110, 112 in the hovering area 140, 240. Furthermore, actions detected 308, 312 for the objects may be indicated by changing the visualization of the displayed objects. For instance, the left-side button of the displayed mouse is moved back in response to detecting the input by the first object 110. Further, an action available by a further input by an object may be indicated in connection with the image or shadow of the respective object.

Figure 7:
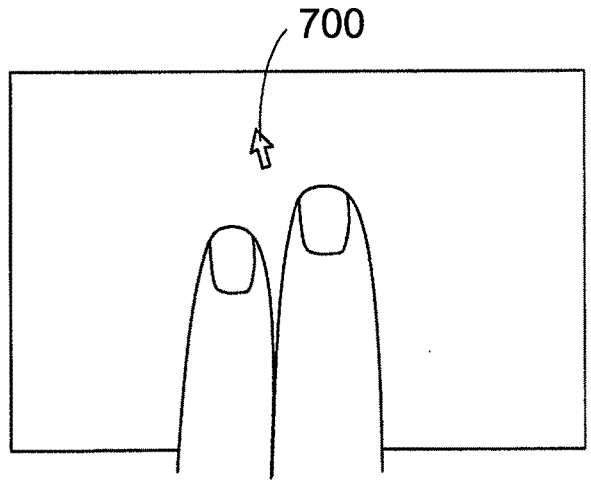
FIG. 7 illustrates a top view of a display with a cursor in relation with an object according to an embodiment of the invention.

In one embodiment the apparatus 10, 200 is configured to cause display of a pointer element in response to the detection of the presence of the first object and the second object 110, 112 in close proximity to the input surface 100. The simplified FIG. 7 illustrates a pointer 700 displayed on a touch screen. The displayed position of the pointer element 700 is changed in relation to detected movement of the first object and/or the second object. Thus, the user may easily detect that a multi-object hovering mode with a virtual mouse type of functionality is active.

In a further embodiment the pointer 700 indicates the target screen area for input made during the multi-object hovering mode. Thus, further virtual mouse logic may be provided by the user interface, and it becomes easier for a user to provide inputs to GUI elements that are small compared to the hovering area 140, 240. For instance, features related to displaying a cursor described in patent application No. PCT/IB2010/050752, incorporated herein by reference, may be applied in connection with the present multi-object hovering input mode.

In one embodiment the multi-object hovering input mode applies only to some of the items displayed on the screen of the apparatus 10, 200. The controller 130, 230 may be arranged to inform the user of which UI objects support the multi-object hovering input mode, such as the virtual mouse button functionality illustrated in connection with FIGS. 5a to 6d, in response to activation of and/or during the multi-object hovering input mode. For instance, such UI objects may be enlarged, brought in front in case of 3D visualization, moved closer to the objects, or the visualization of these items may be changed.

The apparatus 10, 200 may be configured to determine distance between the objects 110, 112 in the hovering area 140, 240. Actions may be selected and during the multi-input hovering mode in accordance with the detected distance (or change of distance). For instance, in response to detecting the first object 110 distancing from the second object 112, a specific action, such as enlarging of an associated GUI element, is triggered. In a further embodiment the initiation and/or deactivation of the multi-object hovering input mode is further affected by the distance between the objects. For instance, a further condition for entering step 304 may be the close proximity between the objects. In one embodiment the distance between the objects is checked in connection with step 302 of FIG. 3. The input mode could be set to be activated only when at least two fingers are close enough to each other. Furthermore, the input mode could be de-activated 318 when the objects 110, 112 are separated far enough from each other.

In one embodiment, a user may configure various settings associated with the multi-object hovering mode. For instance, the user may specify a function associated with an object 110, 112 and/or hovering area 250, 252 to be applied in the multi-object hovering mode. A further example is that the user may select either left-hand or right-hand button arrangement, and the functionality associated with the objects is adapted accordingly. In a further example, further associations are added in accordance with user inputs. For instance, the user may link an action to a further specific hovering input. Thus, the user may tailor the functionality of the multi-object mode according to his or her preferences.

In some embodiments the present features are applied in connection with user interfaces providing 3D interaction, or sense of 3D interaction. For instance, various auto-stereoscopic screens may be applied. The proximity detection system 120, 220 may be configured to determine the distance from the surface 100 and select an action, such as a display output, dependent on the distance. For instance, a GUI element is enlarged when the objects 110, 112 are receding from the surface 100.

In one embodiment the apparatus 10, 200 is configured to detect gestures by one or more objects (separately or in combination) in the hovering area 140, 240 above the input surface to trigger the multi-object hovering mode or to detect inputs during the multi-object hovering mode. Changes in the proximity sensing field may thus be monitored. A gesture is identified based on the detected changes. An action associated with the identified gestures may then be performed. For instance, gesture based inputs may be applied in connection with at least some of the operations in FIGS. 3 to 6*d*. A very simple example is that in response to detecting a gesture similar to movement of a finger when double-clicking a mouse button, a GUI element is selected and a further action is performed for the selected GUI element, e.g. a new application window with contents of a selected URL is displayed. Another example is that the apparatus 10, 200 is configured to detect movement of an object to form a circle and thus move to a subsequent or preceding view.

As already indicated, inputs during the multi-object hovering mode may be associated with touch and/or hovering inputs by the objects 110, 112. For instance, an input on the touch screen 210 by the second object 112, such as a right-side finger, may be associated with a tap selection function, whereas non-touch hovering inputs by the first object 110, such as the left-side finger may be simultaneously monitored.

In one embodiment the apparatus 10, 200 is configured to control user interface action on the basis of further properties associated with movement of a single object or a combination of objects 110, 112 during the multi-object hovering mode. For instance, the apparatus 10, 200 may comprise a pressure sensor connected to the controller 130, 230, and UI operations may be controlled in accordance with the detected pressure. In another example the apparatus is configured to control actions on the basis of time between consecutive inputs, time of touch to the touch screen 210, speed of the movement of the object 110, 112 in the hovering area 140, 240, etc. For instance, two or more actions may be selectable on the basis of speed of the object relative to the touch screen 210, e.g., fast and slow touch inputs could be separated. Such further specific inputs can be detected during the multi-object hovering mode, for instance as additional checks or further checks in connection with at least one of operations 308 to 314 of FIG. 3.

The above-illustrated features may be applied for different applications and applications modes. Some examples of applications for which particular advantages are available include browser applications, applications utilizing maps, media content related applications and services, applications utilizing augmented reality interactions, and the like.

Although some examples have been illustrated above in connection with a small display, the present hovering related features may be applied in connection with large displays and surfaces. Further, the proximity detection system 120, 220 may be arranged to detect fingers of multiple hands. For instance, the system may support hovering by both hands. Further, the system may support detection of hovering by two or more users interacting with different areas of a large display.

Figure 8:
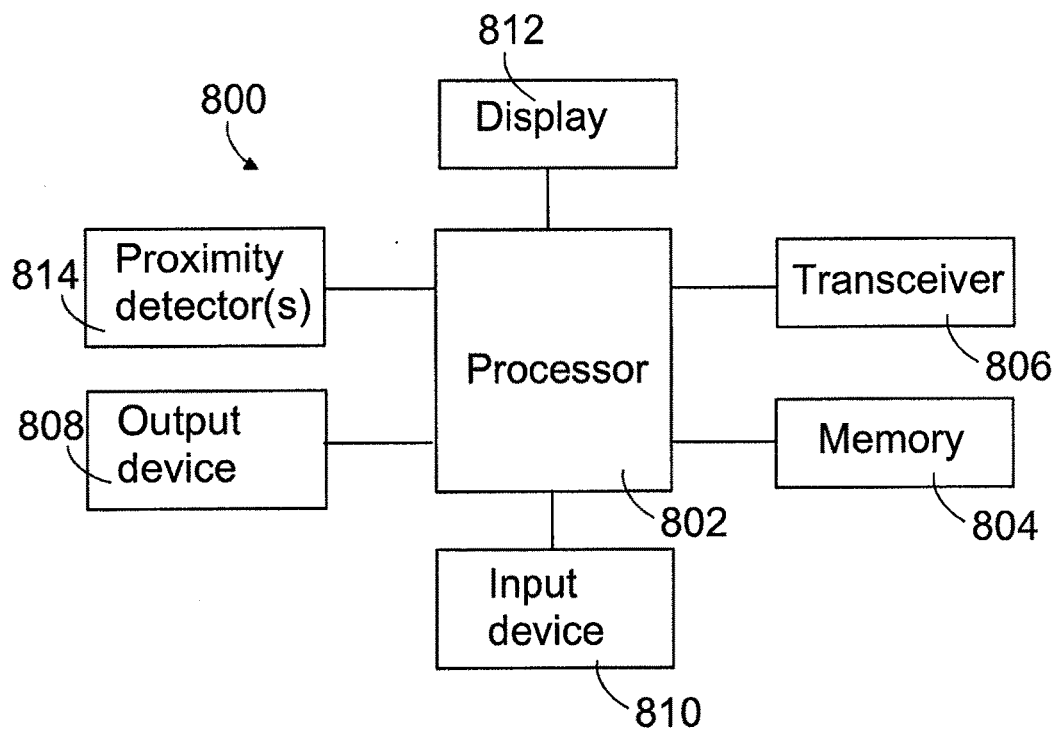
FIG. 8 illustrates an electronic device in accordance with an embodiment of the invention.

FIG. 8 shows a block diagram of the structure of an electronic device 800 according to an example embodiment. The electronic device may comprise the apparatus 10 or 200. Although one embodiment of the electronic device 800 is illustrated and will be hereinafter described for purposes of example, other types of electronic devices, such as, but not limited to, portable digital assistants (PDAs), pagers, mobile computers, desktop computers, laptop computers, media players, televisions, gaming devices, cameras, video recorders, positioning devices, electronic books, wearable devices, projector devices, and other types of electronic systems, may employ the present embodiments. Furthermore, the apparatus of an example embodiment need not be the entire electronic device, but may be a component or group of components of the electronic device in other example embodiments.

A processor 802 is configured to execute instructions and to carry out operations associated with the electronic device 800. The processor 802 may comprise means, such as a digital signal processor device, a microprocessor device, and circuitry, for performing various functions including, for example, one or more of the functions described in conjunction with FIGS. 1 to 7. The processor 802 may control the reception and processing of input and output data between components of the electronic device 800 by using instructions retrieved from memory. The processor 802 can be implemented on a single-chip, multiple chips or multiple electrical components. Some examples of architectures which can be used for the processor 802 include dedicated or embedded processor, and ASIC.

The processor 802 may comprise functionality to operate one or more computer programs. Computer program code may be stored in a non-transitory or tangible memory 804. The at least one memory and the computer program code may be configured to, with the at least one processor, cause the apparatus to perform at least one embodiment including, for example, one or more of the functions described in conjunction with FIGS. 1 to 7. Typically the processor 802 operates together with an operating system to execute computer code and produce and use data.

By way of example, the memory 804 may include non-volatile portion, such as EEPROM, flash memory or the like, and a volatile portion, such as a random access memory (RAM) including a cache area for temporary storage of data. The information could also reside on a removable storage medium and loaded or installed onto the electronic device 800 when needed.

The electronic device 800 may comprise an antenna (or multiple antennae) in operable communication with a transceiver unit 806 comprising a transmitter and a receiver. The electronic device 800 may operate with one or more air interface standards and communication protocols. By way of illustration, the electronic device 800 may operate in accordance with any of a number of first, second, third and/or fourth-generation communication protocols or the like. For example, the electronic device 800 may operate in accordance with wireline protocols, such as Ethernet and digital subscriber line (DSL), with second-generation (2 G) wireless communication protocols, such as IS-136 (time division multiple access (TDMA)), Global System for Mobile communications (GSM), and IS-95 (code division multiple access (CDMA)), with third-generation (3 G) wireless communication protocols, such as 3 G protocols by the Third Generation Partnership Project (3 GPP), CDMA2000, wideband CDMA (WCDMA) and time division-synchronous CDMA (TD-SCDMA), or with fourth-generation (4 G) wireless communication protocols, wireless local area networking protocols, such as 802.11, short-range wireless protocols, such as Bluetooth, and/or the like.

The user interface of the electronic device 800 may comprise an output device 808, such as a speaker, one or more input devices 810, such as a microphone, a keypad or one or more buttons or actuators, and a display 812 for displaying information in two or more dimensions.

The input device 810 may include a touch sensing device configured to receive input from a user's touch and to send this information to the processor 802. Such touch-sensing device may be configured to recognize also the position and magnitude of touches on a touch sensitive surface. The touch sensing device may be based on sensing technologies including, but not limited to, capacitive sensing, resistive sensing, surface acoustic wave sensing, pressure sensing, inductive sensing, and optical sensing. Furthermore, the touch sensing device may be based on single point sensing or multipoint sensing. In one embodiment the input device is a touch screen, which is positioned in front of the display 812. The input device 810 may be configured to operate, in response to the detection (302) of simultaneous proximity of a first object and a second object, in an input mode, in which a first action is associated with an input by the first object and a second action is associated with an input by the second object.

The display 812 could be of any type appropriate for the electronic device 800 in question, some examples include plasma display panels (PDP), liquid crystal display (LCD), light-emitting diode (LED), organic light-emitting diode displays (OLED), projectors, holographic displays and the like. Hovering could be arranged even above a surface on which display is projected. For instance, cameras could be used to detect the proximity and position of the fingers.

The electronic device 800 also comprises a proximity detection system 814, such as the system 120, 220 illustrated earlier, operatively coupled to the processor 802. The proximity detection system 814 is configured to detect when a finger, stylus or other pointing device is in close proximity to, but not in contact with, some component of the computer system including for example housing or I/O devices, such as the touch screen.

The electronic device 800 may comprise also further units and elements not illustrated in FIG. 8, such as further interface devices, a battery, a media capturing element, such as a camera, video and/or audio module, and a user identity module.

Embodiments of the present invention may be implemented in software, hardware, application logic or a combination of software, hardware and application logic. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted in FIG. 8. A computer-readable medium may comprise a computer-readable storage medium that may be any media or means that can contain or store the instructions for use by or in connection with an instruction execution system, apparatus, or device, such as a computer.

If desired, at least some of the different functions discussed herein may be performed in a different order and/or concurrently with each other. Furthermore, if desired, one or more of the above-described functions may be optional or may be combined.

Although various aspects of embodiments of the invention are set out in the independent claims, other aspects comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

The invention claimed is:

1. An apparatus, comprising: at least one processor; and at least one memory including computer program code, the at least one memory and the computer program code configured to, with the at least one processor, cause the apparatus at least to perform:
    receive an indication of a presence of one or more objects hovering in close proximity to an input surface;
    in an instance in which only a single object is indicated to be hovering in close proximity to the input surface, initiate a single input mode in which a first action is performed by the processor in response to subsequent touch input by the single object to the input surface;
    in an instance in which both first and second objects are indicated to be hovering in close proximity to the input surface, initiate a multi-input mode; and
    while in the multi-input mode, determine a relational position of the first and second objects by determining a positional relationship of the first and second objects in a direction extending outwardly from the input surface in order to determine which one of the first and second objects provides touch input to the input surface and which one of the first and second objects remains hovering in close proximity to the input surface; perform a second action by the processor in response to touch input by the first object, as determined by the relational position of the first and second objects, to the input surface without touch input by the second object to the input surface; and perform a third action by the processor in response to touch input by the second object, as determined by the relational position of the first and second objects, to the input surface without touch input by the first object to the input surface, wherein the second action is different from the first and third actions and the third action is different from the first action.

2. The apparatus of claim 1, wherein the apparatus is configured to deactivate the multi-input mode in response to receiving an indication of removal of at least one of the first object or the second object from close proximity to the input surface.

3. The apparatus of claim 2, wherein the apparatus is configured to control at least one of the activation or deactivation of the multi-input mode on the basis of distance between the objects.

4. The apparatus of claim 1, wherein the apparatus is configured to:
    determine an operation in response to a touch input by at least one of the first object or the second object further on the basis of the position of the at least one of the first object or the second object.

5. The apparatus of claim 1, wherein the apparatus is configured to, in response to receiving the touch input by the first object in the multi-input mode,
    perform a selection action for an information element associated with the touch input by the first object, and
    in response to receiving the touch input by the second object, display a menu of selectable items for an information element associated with the touch input by the second object.

6. The apparatus of claim 1, wherein the apparatus is configured to modify at least one association to a graphical user interface element to be displayed in response to the activation of at the multi-input mode or an action during the multi-input mode.

7. The apparatus of claim 1, wherein the apparatus is configured to:
cause display of a pointer element in response to the receiving the indication of the first object and the second object simultaneously in close proximity to the input surface, and
cause display of the pointer element to move in relation to movement of at least one of the first object or the second object.

8. The apparatus of claim 1, wherein an operation is associated during the multi-input mode with the combination of the touch input by the first object and the touch input by the second object.

9. The apparatus of claim 1, wherein the apparatus is a mobile communications device comprising a touch screen and a proximity detection system with at least one proximity detector.

10. A method, comprising:
receiving an indication of presence of one or more objects hovering in close proximity to an input surface;
in an instance in which only a single object is indicated to be hovering in close proximity to the input surface, initiating a single-input mode in which a first action is performed by a processor in response to subsequent touch input by the single object to the input surface;
in an instance in which both first and second objects are indicated to be hovering in close proximity to the input surface, initiating a multi-input mode; and
while in the multi-input mode, determining a relational position of the first and second objects by determining a positional relationship of the first and second objects in a direction extending outwardly from the input surface in order to determine which one of the first and second objects provides touch input to the input surface and which one of the first and second objects remains hovering in close proximity to the input surface; performing a second action by the processor in response to touch input by the first object, as determined by the relational position of the first and second objects, to the input surface without touch input by the second object to the input surface; and performing a third action by the processor in response to touch input by the second object, as determined by the relational position of the first and second objects, to the input surface without touch input by the first object to the input surface, wherein the second action is different from the first and third actions and the third action is different from the first action.

11. The method of claim 10, further comprising:
deactivating the multi-input mode in response to receiving indication of removal of at least one of the first object or the second object from close proximity to the input surface.

12. The method of claim 10, wherein, an operation is determined in response to a touch input by at least one of the first object or the second object further on the basis of the position of the at least one of the first object or the second object.

13. The method of claim 10, wherein at least one association to a graphical user interface element to be displayed is modified in response to the activation of the multi-input mode or an action during the multi-input mode.

14. The method of claim 10, further comprising:
in response to receiving an indication of the touch input by the first object, performing a selection action for an information element associated with the touch input by the first object, and
in response to receiving an indication of the touch input by the second object in the multi-input mode, displaying a menu of selectable items for an information element associated with the touch input by the second object.

15. The method of claim 10, wherein at least one of the activation or deactivation of the multi-input mode is controlled on the basis of distance between the objects.

16. The method of claim 10, further comprising:
causing display of a pointer element in response to the indication of the presence of the first object and the second object simultaneously, and
causing display of the pointer element to move in relation to movement of at least one of the first object or the second object.

17. A computer program product comprising a non-transitory computer readable storage medium comprising one or more sequences of one or more instructions which, when executed by one or more processors of an apparatus, cause the apparatus to at least perform:
receive an indication of a presence of one or more objects hovering in close proximity to an input surface;
in an instance in which only a single object is indicated to be hovering in close proximity to the input surface, initiate a single input mode in which a first action is performed in response to subsequent touch input by the single object to the input surface;
in an instance in which both first and second objects are indicated to be hovering in close proximity to the input surface, initiate a multi-input mode; and
while in the multi-input mode, determine a relational position of the first and second objects by determining a positional relationship of the first and second objects in a direction extending outwardly from the input surface in order to determine which one of the first and second objects provides touch input to the input surface and which one of the first and second objects remains hovering in close proximity to the input surface; perform a second action in response to touch input by the first object, as determined by the relational position of the first and second objects, to the input surface without touch input by the second object to the input surface; and perform a third action by the processor in response to touch input by the second object, as determined by the relational position of the first and second objects, to the input surface without touch input by the first object to the input surface, wherein the second action is different from the first and third actions and the third action is different from the first action.

18. An apparatus, comprising:
means for receiving an indication of presence of one or more objects hovering in close proximity to an input surface;
in an instance in which only a single object is indicated to be hovering in close proximity to the input surface, means for initiating a single-input mode in which a first action is performed in response to subsequent touch input by the single object to the input surface;
means for receiving an indication of simultaneous presence of the first object and a second object hovering above and in close proximity to the input surface, and in an instance in which both first and second objects are indicated to be hovering in close proximity to the input surface, means for initiating a multi-input mode; and while in the multi-input mode, means for determining a relational position of the first and second objects by determining a positional relationship of the first and second objects in a direction extending outwardly from the input surface in order to determine which one of the first and second objects provides touch input to the input surface and which one of the first and second objects remains hovering in close proximity to the input surface; means for performing a second action in response to touch input by the first object, as determined by the relational position of the first and second objects, to the input surface without touch input by the second object to the input surface; and means for performing a third action in response to touch input by the second object, as determined by the relational position of the first and second objects, to the input surface without touch input by the first object to the input surface, wherein the second action is different from the first and third actions and the third action is different from the first action.

* * * * *